(12) United States Patent
Eick et al.

(10) Patent No.: US 10,634,802 B2
(45) Date of Patent: Apr. 28, 2020

(54) PRIME NUMBER SURVEY DESIGN

(71) Applicant: ConocoPhillips Company, Houston, TX (US)

(72) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 85 days.

(21) Appl. No.: 15/252,371

(22) Filed: Aug. 31, 2016

(65) Prior Publication Data

US 2017/0059724 A1 Mar. 2, 2017

Related U.S. Application Data

(60) Provisional application No. 62/212,863, filed on Sep. 1, 2015.

(51) Int. Cl.
*G01V 1/20* (2006.01)
*G01V 1/00* (2006.01)
*G01V 1/143* (2006.01)

(52) U.S. Cl.
CPC .............. *G01V 1/003* (2013.01); *G01V 1/20* (2013.01); *G01V 1/143* (2013.01); *G01V 2210/1295* (2013.01); *G01V 2210/1425* (2013.01); *G01V 2210/32* (2013.01)

(58) Field of Classification Search
CPC ................................. G01V 1/20; G01V 1/003
USPC ....................................................... 367/56, 58
See application file for complete search history.

(56) References Cited

U.S. PATENT DOCUMENTS

| | | | | |
|---|---|---|---|---|
| 5,402,391 A | * | 3/1995 | Cordsen | G01V 1/20 367/56 |
| 5,430,689 A | * | 7/1995 | Rigsby | G01V 1/3861 367/56 |
| 5,598,378 A | * | 1/1997 | Flentge | G01V 1/20 367/56 |
| 6,028,822 A | * | 2/2000 | Lansley | G01V 1/20 367/58 |
| 7,974,153 B2 | | 7/2011 | Elkington et al. | |
| 8,897,094 B2 | | 11/2014 | Eick et al. | |
| 2008/0080309 A1 | * | 4/2008 | Elkington | G01V 1/20 367/56 |
| 2011/0116344 A1 | | 5/2011 | Crice et al. | |
| 2013/0100769 A1 | * | 4/2013 | Riley | G01V 1/20 367/37 |

(Continued)

FOREIGN PATENT DOCUMENTS

| | | |
|---|---|---|
| EP | 2383588 A2 | 11/2011 |
| EP | 3045937 A1 | 7/2016 |

OTHER PUBLICATIONS

Lawton et al., "A 3D seismic survey for mapping shallow targets", Back-to-Exploration, 2008 CSPG CSEG CWLS Convention.*

(Continued)

*Primary Examiner* — Ian J Lobo
(74) *Attorney, Agent, or Firm* — Polsinelli PC

(57) ABSTRACT

Methods of designing seismic survey and acquisition of seismic data with reduced noise using equally or optimally irregularly spaced sources or receivers are described. Specifically, prime number ratios for the station to line spacing is used to prevent harmonic leakage and other noise contaminations in the acquired seismic data.

16 Claims, 2 Drawing Sheets receivers = squares, sources = circles
receivers line/station = 5:1, source line/station = 3:1

(56) References Cited

U.S. PATENT DOCUMENTS

2013/0100772 A1\* 4/2013 Girouard ............... G01V 1/003
                                                          367/56

OTHER PUBLICATIONS

International Search Report, PCT/US2016/049588, dated Dec. 29, 2016; 4 pgs.

\* cited by examiner receivers = squares, sources = circles
receivers line/station = 6:1, source line/station = 4:1 receivers = squares, sources = circles
receivers line/station = 5:1, source line/station = 3:1

PRIME NUMBER SURVEY DESIGN

PRIOR RELATED APPLICATIONS

This application is a non-provisional application which claims benefit under 35 USC § 119(e) to U.S. Provisional Application Ser. No. 62/212,863 filed Sep. 1, 2015, entitled "PRIME NUMBER SURVEY DESIGN," which is incorporated herein in its entirety.

FIELD OF THE DISCLOSURE

The disclosure relates to methods of seismic survey design, particularly to methods for reducing noise train leakage into processed data.

BACKGROUND OF THE DISCLOSURE

Seismic surveys image or map the subsurface of the earth by imparting acoustic energy into the ground and recording the reflected energy or "echoes" that return from the rock layers below. Each time the energy source is activated, it generates a seismic signal that travels into the earth, is partially reflected, and, upon its return, may be recorded at many locations on the surface as a function of travel time.

In the process of acquiring seismic data, a crew is typically deployed across several square miles of a survey area positioning cables and seismic receivers while seismic sources move from predetermined point to predetermined point to deliver vibrational seismic energy into the earth. The receivers record the reflected signals and the recordings are subsequently processed to develop images of geologic structures under the surface.

A land survey typically uses one of two energy sources to generate the down going seismic signal: either an explosive source or a vibrational source. Of particular interest for purposes of this disclosure is the use of seismic vibrator. A seismic vibrator generally takes the form of a truck or other vehicle that has a base plate that can be brought into contact with the earth. Conventionally, a reaction mass in association with a baseplate is driven by a system to produce vibratory motion, which travels downward into the earth via the base plate.

The vibroseis system was introduced by ConocoPhillips in the 1960s, and since that time, it has become the preferred source in those areas where it can operate. A vibrator is excited by a pilot signal that varies in frequency. In addition to the fundamental frequency, harmonics are generated by non-linearities in the vibrator mechanism and the earth. The nonlinearities include nonlinear coupling of the vibrator to the ground, the nonlinear effects in the vibrator itself, and inadequacy of the feedback system. Thus, an important issue of vibroseis data enhancement is the treatment or suppression of upper harmonics.

The vibrational source generates harmonics which, in certain circumstances, can have an energy approaching or even exceeding the fundamental signal, and which can crossfeed with signals from other sources, giving misleading results when the signals are processed to separate the signals from each source. In addition, the harmonics are a source of noise and can mask weak reflection signals from deeper layers.

The receivers that are used to detect the returning seismic energy for the land survey usually take the form of sensors like geophones or accelerometers. The returning reflected seismic energy is acquired from a continuous signal representing displacement, velocity or acceleration that may be represented as an amplitude variation as a function of time.

Typically, thousands of discrete seismic receivers are used to gather seismic data. The seismic receivers are generally laid out in lines that are substantially parallel and laterally spaced at equal distances and uniformly spaced down the line. In this configuration, uniform coverage of the subsurface is achieved. It is conventional that receiver spacing along the lines is closer than the spacing between the lines and that, therefore, the wavefield detected by the sensors is less well sampled in the lateral direction (perpendicular to the receiver lines) in most seismic surveys. Other survey designs are possible, but this layout is typical.

The receivers may also detect noise generated from one or more seismic sources that are not part of the seismic survey or from overlapping sweeps. These noises may distort the acquired seismic data by, for example, overlapping with a main reflected seismic wavefield that is the aim of the survey's measurement. The noises may also reach the receivers from directions that are significantly different with respect to the main reflected seismic wavefield. For instance, during slip-sweep acquisition, a second vibrator group starts its sweep before the end of the listen time of the first sweep. This overlapping approach is different from simultaneous shooting in that it does not require the vibrators to be ready at their locations at the same time. However, harmonic noise from adjacent sweeps can leak into each other, contaminating the records.

Due to the increasing reliance on seismic surveys for oil field development and the push for simultaneous sourcing of the surveys, much effort has been made to improve survey designs to either supress the noise or to separate the noise from the signal. Thus, there exists a need for methods that improve the quality of acquired seismic data by removing the effects of harmonics and other types of noise.

SUMMARY OF THE DISCLOSURE

The present disclosure relates to designing a seismic survey to reduce harmonic leakage and noise trains and methods of acquiring seismic data with the survey. In particular, the survey should be designed to have prime numbers ratios between receiver station spacing to line spacing ratio.

Traditionally, the receivers on all the receiver lines are equidistant and all lines are symmetrically placed, i.e., the receivers are in a rectangular array. Commonly, there is no stagger between the receivers in two adjacent receiver lines. The source lines are likewise symmetrical and are placed midway between adjacent receivers. Such a survey geometry provides seismic data for common-midpoints, which correspond to cells or bins having the dimensions of one-half (½) the spacing between adjacent receivers on the receiver lines and one-half (½) the spacing between adjacent source points along the source lines.

Obviously, an orthogonal layout is the simplest case and one skilled in the art can appreciate that stagger and station spacing can be varied to achieve different design goals and more modern techniques have allowed for even or optimized irregular spacings to improve data quality. For the purposes of this disclosure, even spacing as described above is assumed to represent nominally even spacing or optimized irregular spacings.

A common method of describing a simplified survey mentioned above is by the measure of the ratio of the receiver line spacing to the receiver station spacing, and also source line spacing to source station spacing. Thus, the simplest case is if the line spacing to stations spacing ratio was set to be double. In this case there would be two evenly spaced or, optimally irregularly spaced stations per line increment. Similarly, if there were 4 even or optimized irregularly spaced stations to one line increment, the ratio would be 4 or, stated another way, if the receiver station spacing is 25 m and the line spacing is 100 m then this would be a 4 to 1 survey.

This description of line spacing to station spacing can be applied to both source and receivers and as an example, if the source and receivers stations are spaced 30 m apart while the source lines are at 120 m and the receiver lines are at 180 m then the ratios would be 4 to 1 source and 6 to 1 on the receiver.

Common ratios for such surveys are 4, 6, 8, 10 and 12 to 1. This means that the spacing of the even or optimized irregularly spaced receivers along the line is between half and one twelfth the spacing between parallel receiver lines. This description can be used for non-orthogonal surveys like the industry standard slash surveys of various angles in the same way.

The inventors have found that such even number ratios are problematic. Even number ratios are more divisible, thus allowing more harmonics leakage and increased noise in the acquired data. Further, this divisibility opens the door for more noise features, like source-generated noise and cross line noise problems. In particular, a ratio of 2 to 1 experiences heavy harmonic leakage into the spatial data. Thus, many processing steps must be taken to reduce the noise effects on the data.

The present invention discloses methods of acquiring seismic survey data without divisible increments in order to reduce leakage of harmonics and noise trains in the final processed dataset. Specifically, the survey design uses prime number line spacing to station spacing ratio to reduce noise features and harmonic leakage. This simple design choice reduces the harmonic leakage and the inclusion of other noise sources in the data. The survey design can be utilized with both above ground data acquisition methods and marine seismic methods like OBN, OBC or towed streamer type acquisitions.

In one embodiment is a method of acquiring seismic data including deploying receivers and sources in a plurality of lines in a survey area where each receiver or source is laterally evenly or optimized irregularly spaced from one another in two horizontal directions wherein the ratio of line spacing in at least one horizontal to the spacing between stations is a prime number. Preferably, the ratios are 3:1, 5:1, 7:1, and 11:1 ratios. Most preferably, the ratios are 3:1 or 5:1. The method further includes directing seismic energy into the ground and recording reflected and/or refracted seismic data with the deployed seismic receivers, recovering the measured data from the deployed seismic receivers, and mapping the sub surface.

Energy sources used in the present survey designs includes seismic vibrators, airguns, plasma shots, dynamite, and other sources known to one of ordinary skill in the art. Further, this method can be used with any sweeping or impulsive source technique. Reservoir applications demand quick acquisition for large volumes and typically require overlapping vibratory shots.

The present method is ideal for these types of sweeps as it reduces harmonic leaking between shots and adjacent vibrators. Thus, it improves data quality rather than acquisition efficiency. As such, the present methods can be used with the slip sweep, flip-flop, cascaded sweeps, and any of the simultaneous shooting methods. Other multiple source seismic surveys techniques including NUOS™ (Non-Uniform Optimal Sampling), ZenSeis®, HPVA, high fidelity vibratory seismic (HFVS), cascaded HFVS, combined HFVS, slipsweep, and the like can also be used. The method of sourcing is not material to the results of the survey.

Receivers that can be used in the method include any known in the art or developed in the future, including geophones, hydrophones, accelerometers, electrodynamic receivers, node receivers, and the like. Receivers may receive one or more than one type of data including vibrational data, acceleration data, magnetic data, and gravitational data. However, the method of receiving the data is not material to the results of the survey.

The acquired seismic data with reduced harmonic leakage and noise can then undergo further processing before being utilized in mapping or imaging 2D or 3D seismic maps with commercially available software.

Another embodiment is a method of acquiring seismic data including deploying receivers and sources in a plurality of lines in a survey area where each source or receiver is deployed in lines, usually perpendicular to one another but not necessarily so, such that the ratio of line spacing to station spacing is a prime number to 1 (prime:1). Preferably, the ratios are 3:1, 5:1, 7:1, and 11:1 ratios. Most preferably, the ratios are 3:1 or 5:1. The receivers at least should have this prime number ratio, and preferably both sources and receiver have a prime:1 ratio. They may have the same ratio, but are preferably different.

The method further includes directing seismic energy into the ground from a seismic source and recording reflected and/or refracted seismic data with the deployed seismic receivers, recovering the measured data from the deployed seismic receivers, and mapping the subsurface. Of course, there are many steps involved in processing the data collected from the prime number survey, but any methodology can be used, and these details are omitted herein for simplicity. Thus, migration, normal moveout, filtering techniques and the like are not discussed but understood to be used as appropriate.

As mentioned, the spacing ratios can be the same for the receivers and sources or they can be different. In recent history, the source and receiver spacing were sized differently in land surveys, where typically the sources would be coarser than the receivers because sources costs more than receivers, although the reverse is true in marine surveys. Thus, spacing out the sources further made the survey cheaper. The current trend is to have simultaneous sourcing or non-uniform spacing and blended sources. The use of Compressive Seismic Imaging (CSI) technologies has allowed even higher resolution through careful acquisitions and processing. The disclosed embodiments can be used with any receiver or source spacing, which may or may not be the same.

This summary is provided to introduce a selection of concepts that are further described below in the detailed description. This summary is not intended to identify key or essential features of the claimed subject matter, nor is it intended to be used as an aid in limiting the scope of the claimed subject matter.

Generally, a surface area to be surveyed is divided into small discrete rectangular areas known as "bins". The size of the bins is dependent upon the anticipated resolution required.

The distance between adjacent source points along a single seismic source line is defined as the "source-station spacing." By convention, the line with the smaller spacing used is referred to as station spacing, and the crossing lines with the larger spacing is line spacing. The "source line spacing" is the spacing between adjacent source lines.

The distance between adjacent receivers along a single seismic receiver line is defined as the "receiver-station spacing." The "receiver line spacing" is the spacing between adjacent receiver lines.

It should be appreciated herein that although sources may be drawn in a grid like pattern, they are not typically performed as drawn, but instead one or more receiver sources travels to each point in the grid, and provides a signal to the earth, and then moves along to the next grid point for a repeat of the signal. By contrast, very often thousands of receivers are provided in an array like pattern, although the arrays may be moved as the survey progresses if the field is larger than the available array of receivers.

As used herein, the term "harmonics leakage" refers to source generated noise that occurs as a multiple of the primary signal. As an example, mechanical vibrators generate both even and odd harmonic distortion and signal during the sweep, so a 20 Hz signal generates the $2^{nd}$ harmonic at 40 Hz, the $3^{rd}$ harmonic at 60 Hz, and so forth.

As used herein, the term "noise trains" refers to undesired signals that tend to travel either coherently or incoherently away from their source and suppress the desired reflector signal. Commonly these are source-generated noises such as the air-blast off the vibrator plate during the sweep.

As used herein, the term "optimally irregular" refers to a type of survey sampling that lends itself to an optimal non-uniform sampling plan. A uniform sampled survey has a natural grain in it that limits what we can do with the data and what frequencies (spatially) can be recovered. Random surveys have been shown to recover higher frequencies and better resolution due to the non-uniform sampling over consistent sampling. The problem with random surveys is that the quality of the survey is left up to chance. Some random surveys can be good, some can be bad, but it is just luck to obtain an optimal irregular sampling for a survey if you use a random pattern. Optimal irregular sampling models the survey design and applies the compressive sensing imaging (CSI) techniques and non-uniform optimal sampling (NUOS) sampling criteria and techniques to come up with the optimal non-uniform sampling plan for the survey.

The verb "imaging" as used herein means to display or print an image or visual representation of a reservoir. The verb "mapping" includes imaging, as well as providing mathematical descriptions or models thereof.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| CMP | Common midpoints |
| HPVA | High-Productivity Vibroseis Acquisition |
| HFVS | high fidelity vibratory seismic |
| OBN | Ocean bottom node (a cable free system) |
| OBC | Ccean bottom cable |

DESCRIPTION OF EMBODIMENTS OF THE DISCLOSURE

Figure 1:
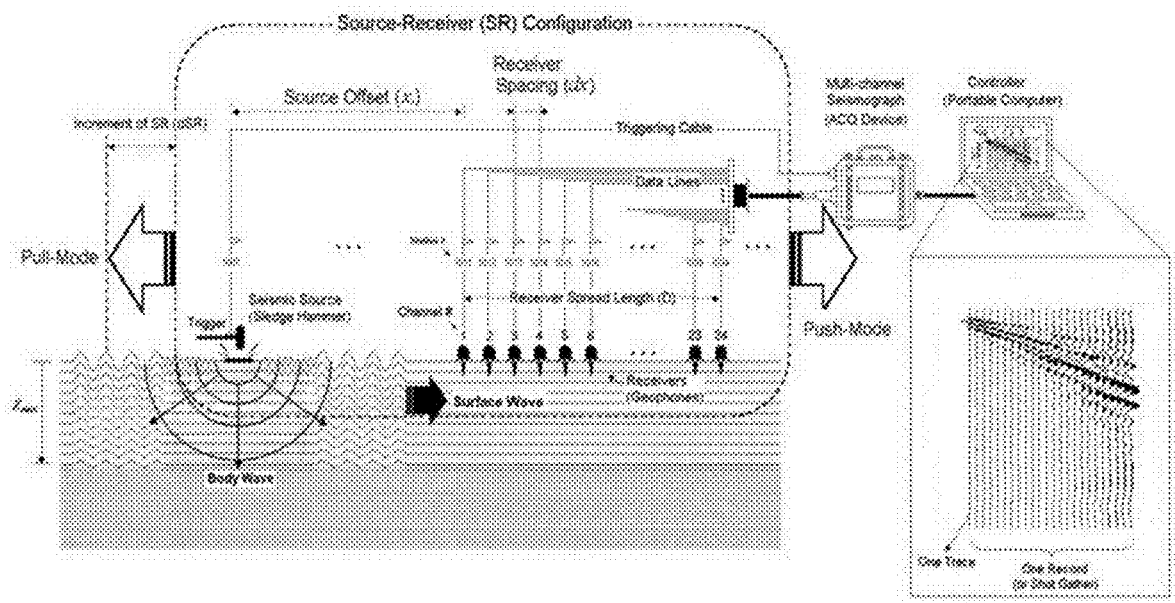
FIG. 1. Schematic of overall field setup for a seismic survey.

The invention provides a novel seismic survey design and methods of acquiring seismic data for surveying with reduced harmonic leakage and noise. Particularly, the survey uses prime number ratios for the receiver line spacing to station spacing ratio. This prime number ratio removes the divisible increments in the survey design, thus allowing the acquisition of better quality data with less natural leakage of noise and spatially aliased noise sources in the field using even or optimized irregular spaced sources and receivers. Sources can also use prime ratios, and the receivers and sources can use the same prime ratios or be different.

The present methods includes any of the following embodiments in any combination(s) of one or more thereof:

A seismic survey design comprising a plurality of spaced seismic energy sources arranged in a linear array to form at least one source line wherein a first ratio of source line spacing to source station spacing is a prime number greater than one and, a plurality of spaced seismic energy receiver stations arranged in a linear array to form at least one receiver line wherein a second ratio of receiver line spacing to receiver station spacing is a prime number greater than one. The ratio(s) can be 3:1, 5:1, 7:1, or 11:1, and they can be the same or different.

The receiver and seismic sources can be equally or optimally irregularly spaced in a given line. The line to station spacings can be the same for both the receivers and sources or can be different.

A method of acquiring seismic data of a subsurface comprising implementing the seismic survey design described herein, directing seismic energy into the ground using the source line, recording reflected and/or refracted seismic data with said receiver line, retrieving recorded data from the receiver line, and mapping or imaging the subsurface with the retrieved recorded data. Additionally, this method can include one or more data processing steps before the mapping or imaging step. In the source application or 'directing' step of a survey method as herein described, each source can be sequentially activated, or a plurality of sources are sequentially activated, i.e., simultaneous sourcing.

A method of seismic mapping a reservoir comprising: placing a plurality of equally or optimally irregularly spaced seismic energy source stations in a linear array to form a plurality of source lines above a target reservoir; overlapping the source lines with a plurality of roughly perpendicular receiver lines formed by a plurality of equally or optimally irregularly spaced seismic energy receiver stations in a linear array, wherein the ratio of receiver line spacing to receiver station spacing is a prime number to one, excluding 1:1; directing seismic energy into the ground using the plurality of source lines; recording reflected and/or refracted seismic data with the plurality of receiver lines; retrieving recorded data from the receiver lines; and, mapping and/or imaging the target reservoir with the retrieved recorded data. Additionally, this method can include one or more data processing steps before the mapping and imaging step.

A method of seismic survey, seismic mapping or seismic survey design as herein described, preferably using prime number to one ratios of 3:1, 5:1, 7:1 and 11:1 for the station to line spacing ratios, preferably of 5:1 for sources and 3:1 for receivers, or the reverse in marine surveys.

A method of seismic survey as herein described, wherein the seismic energy is directed into the ground with a slip sweep, a cascaded sweep, simultaneous shooting or a combination thereof. Preferable a NUOS™, blended (CSI approach) or ZENSEIS® simultaneous source technique is used. The receiver and seismic sources can be equally or optimally irregularly spaced. The spacing can be the same for both the receivers and sources or it can be different.

An overall field setup for a seismic survey is shown in FIG. 1. For a typical seismic survey design, a plurality of sources is nominally equally or optimized irregularly spaced along a source line. A plurality of receivers is similarly nominally spaced equally or optimally irregularly spaced along a receiver line, and the sources and receivers are usually roughly perpendicular, though angles of other than 90° can be used. A plurality of the receiver stations are arranged in a line equally or optimally irregularly spaced apart and the lines are generally parallel. Similarly, a plurality of the source stations are arranged in equally or optimally irregularly spaced apart and the source lines are generally parallel.

The spacing of the lines relative to the station spacing is normally integrally divisible and commonly 6, 8, 10 or 12 to 1 ratio such that the receiver line spacing divided by the source station spacing has a zero remainder and visa versa. This differs from the Flexi-bin patent in U.S. Pat. No. 5,402,391 where the remainder is a positive number.

In this general case, the source lines are overlaid perpendicularly with the receiver lines so that the lines cross and form a rectangular grid on the earth's surface. A seismic source such as a land vibrator operating is used to generate seismic waves, sensed by the active receivers deployed along the preset geometry (also known as a receiver patch), and then recorded by a digital device called seismograph. The acquired data can then be processed and used to created 2D or 3D seismic maps, or even 4D or 5D maps. This same method could be applied in marine surveys using marine airguns, vibrators, and OBN/OBC equipment or even towed streamers.

As mentioned above, the receiver line spacing is typically an even multiple of the source spacing. The spacings are such so that, at every intersection of the source and receiver lines, the source and receiver are coincident such that the central midpoint (CMP) are at the center of the bins. Normal industry convention is to offset the source station and receiver stations to the corners of the bins and lines so that the actual source station and receiver stations are not coincident. This minimizes the damage to the recording hardware when the source hardware activates at the shot station location.

Figure 2A:
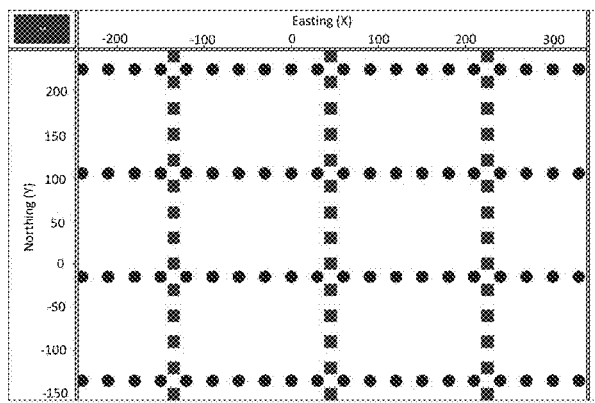
FIG. 2A. A typical prior art survey design wherein receiver lines are spaced at four times the receiver station (squares) spacing and the sources are spaced six times the source station spacing (circles).

FIG. 2A shows a typical prior art survey design wherein receiver lines to station spacing is 4:1 (squares) and the source line to station spacing is 6:1 (circles).

Many attempts to reduce harmonics leakage and other noise in the acquired seismic data have been made to the typical survey design. For instance, the Flexi-bin® approach from Geophysical Exploration and Development Corporation (GEDCO), mentioned previously, selects the source, receiver and line spacings so that only every second to tenth intersection of the source and receiver lines involves substantially coincident alignment of a source and receiver. Thus, in the Flexi-bin® approach, the line spacing divided by the opposite element station spacing has a positive remainder and visa versa. This results in a plurality of spaced apart CMP's distributed in each bin. While the Flexi-bin method has shown promise in reducing noise, there is room for improvement. Other methods include using complicated Fourier transforms, which can identify the harmonic noise and distortion but cannot solve the sampling problem to remove them.

The primary problem with the even or optimized irregular sampling is dealing with the source generated even and odd harmonics during the sweep. When a vibratory source like a standard land vibrator shakes a sweep, it generates even and odd harmonic noise and distortion. These harmonics are at multiples of the sweep frequency, so the second order harmonic of a 10 Hz primary is at 20 Hz and the third order harmonic is at 30 Hz and so forth. These harmonics are recorded as signal at the receivers, which cannot differentiate between what is desired (primary signal) and what is not (harmonic signal). Normal array approaches cannot address the harmonics because they would impact the primary signal of the sweep when it was at the harmonics frequency. Thus, the harmonic data tends to leak into the recorded data as source generated noise that must be addressed in later processing.

In this disclosure, odd, prime number ratios of line spacing to station spacings have been found to attenuate the amount of harmonic data that leaks into the processed final data cubes. As an example, consider a line to station spacing of 6:1. In this case, a station spacing of 50 m equates to a line spacing of 300 m. Next, consider source generated ground roll with a natural surface propagation velocity of 1000 m/sec and a dominant frequency of 20 Hz. In this case, the wavelength is 50 m. This ground roll will be constructively sampled and recorded by the receiver grid at each time the primary and harmonics sweep past about 20 Hz. Thus, a 5 Hz start sweep will create a fourth order harmonic right at 20 Hz and by the time the sweep up to 10 Hz the second harmonic will be at 20 Hz and the data will be constructively sampled into the recording grid. Due to the even spacing of the receiver lines, there are several frequencies that will constructively stack in and leak the harmonics and ground roll into the spread. Therefore, the acquisitions active patch, meaning the number of lines of receivers actively recording the data becomes a spatial array sampling the primary and harmonics in constructive ways in this case.

Consider the same scenario described above, but also space the source lines at 300 m and the source stations at 50 m (6:1). In this scenario, the same leakage into the data occurs not only on the receiver grids, but is reinforced on each source line in similar fashion. While the data is well sampled, and the harmonics and noise can be somewhat addressed in processing, why not improve the dataset by not allowing this natural leakage of even harmonics of the ground roll or similar noise trains into the dataset? The current designs disclosed in this application addresses means to preventing natural leakage of even harmonics. By changing the line spacing to an odd prime number, then the fewest possible harmonics will leak into the dataset.

Figure 2B:
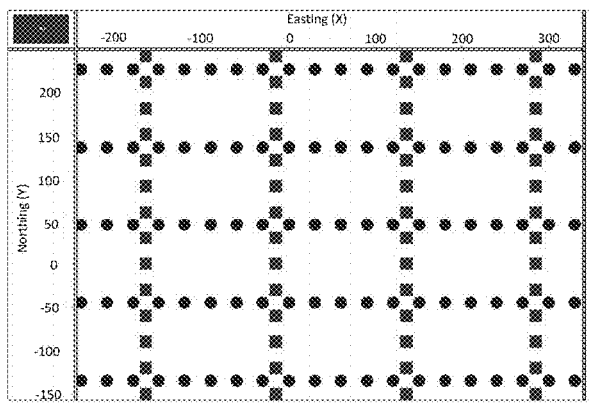
FIG. 2B. One embodiment of a prime number survey design in the current invention wherein receiver lines are spaced at three times the receiver station (squares) spacing. The source lines are spaced five times the source station (circles) spacing.

FIG. 2B. shows one simple embodiment of a prime number survey design in the current invention wherein receiver lines are spaced at three times the receiver station (squares) (3:1) spacing, and the source lines are spaced five times the source station (circles) spacing (5:1 spacing). These diagrams show receiver and source spacing approximately the same, but that is for simplicity only, and they do not have to be the same.

As another example, one can change the line spacing to 350 m with a 7 to 1 ratio on the receiver side of the problem. Within a maximum usable offset range, increasing the spacing with the same number of lines active will move lines beyond the mute radius and are not worth recording so the active number of receiver lines is reduced. As such, the second order harmonic is at 50 m and will be recorded, constructively, but the third (150 m wavelength) fourth (200 m), fifth (250 m) and sixth (300 m) will not be recorded constructively. It is not until the seventh order harmonic that a good coherent wavelength is recorded. One can see that the number of opportunities to let harmonics leak into the active spread has now been reduced because there are less lines on one hand, but also because there are fewer places in the active patch that let the harmonics stack in.

If this concept is extended to the source side and a five to one ratio is set for the source lines, then the amount of harmonic leakage is even further reduced. This particular selection of ratios will reduce the divisibility of the data, reduce or suppression harmonic leakage between shots and/or adjacent sources, and reduce overall noise train.

Field testing has shown that less noise and harmonic contaminated data can be collected using odd prime number ratios over even ratios for line spacing to station spacing. So a 3 to 1 receiver grid and 5 to 1 source grid is preferable to a 4 to 1 source and receiver grid for attenuation of harmonic noise generated in the field. In the same manner, a 3 to 1 source grid and 5 to 1 receiver grid is also better but may be more economically beneficial if simultaneous acquisitions is undertaken. As with all seismic survey parameters, selection is often a compromise of trying to balance the needs of sampling, with noise suppression, costs, access and many other factors. There is no one answer that works in every case.

The techniques and spacing rules described herein can be applied to non-orthogonal surveys, zig-zag, slash surveys or any other of the common regularly sampling source and receiver layouts in use in the industry. These techniques can also be applied to non-uniformly sampled surveys in a similar manner.

The following references are incorporated by reference in their entirety for all purposes.

U.S. Pat. No. 5,402,391 Arrangement of source and receiver lines for three-dimensional seismic data acquisition

The invention claimed is:

1. A method of acquiring seismic data of a subsurface, the method comprising:
   implementing a seismic survey design using:
      a plurality of spaced seismic energy source stations arranged in a linear fashion to form a plurality of source lines, wherein a first ratio of source line spacing to source station spacing is a prime number greater than one to one (prime:1), and
      a plurality of spaced seismic energy receiver stations arranged in the linear fashion to form a plurality of receiver lines, wherein a second ratio of receiver line spacing to receiver station spacing is another prime number greater than one to one (prime:1);
   performing a seismic survey in accordance with the seismic survey design;
   recording seismic data obtained via the seismic survey; and,
   mapping the subsurface with the recorded seismic data, wherein,
      the first ratio and the second ratio are different prime numbers.

2. The method of claim 1, further comprising:
   executing one or more seismic data processing steps before the mapping of the subsurface.

3. The method of claim 1, wherein the first ratio and/or the second ratio is 3:1, 5:1, 7:1, and/or 11:1.

4. The method of claim 1, wherein the seismic survey is performed by directing seismic energy into the ground with a slip sweep, a cascaded sweep, simultaneous shooting or a combination thereof.

5. The method of claim 1, wherein the recording of the seismic data sequentially activates a plurality of sources.

6. The method of claim 1, wherein the plurality of spaced seismic energy receiver stations and the plurality of receiver lines and the plurality of spaced seismic energy source stations and the plurality of source lines have the same spacing.

7. The method of claim 1, wherein the plurality of spaced seismic energy receiver stations and the plurality of receiver lines and the plurality of spaced seismic energy source stations and the plurality of source lines have different spacings.

8. A method of acquiring seismic data of a subsurface, the method comprising:
   implementing a seismic survey design using:
      a plurality of seismic energy source stations linearly arranged to form a plurality of source lines, the plurality of seismic energy source stations having a first ratio of source line spacing to source station spacing, and
      a plurality of seismic energy receiver stations arranged in linearly arranged to form a plurality of receiver lines, the plurality of seismic energy receiver stations having a second ratio of receiver line spacing to receiver station spacing;
   performing a seismic survey in accordance with the seismic survey design;
   recording seismic data obtained via the seismic survey; and
   mapping the subsurface with the recorded seismic data, wherein,
      wherein the first ratio and the second ratio are different prime numbers.

9. The method of claim 8, wherein the first ratio is 3:1 or 5:1.

10. The method of claim 8, wherein the second ratio is 3:1 or 5:1.

11. The method of claim 8, wherein one of the first ratio and the second ratio is 3:1, 5:1, 7:1, or 11:1.

12. The method of claim 8, further comprising:
   executing one or more seismic data processing steps before the mapping of the subsurface.

13. The method of claim 8, wherein the seismic survey is performed by directing seismic energy into the ground with a slip sweep, a cascaded sweep, simultaneous shooting or a combination thereof.

14. The method of claim 8, wherein recording seismic data sequentially activates a plurality of sources.

15. The method of claim 8, wherein the plurality of seismic energy receiver stations and the plurality of receiver lines and plurality of seismic energy source stations and the plurality of source lines have a same spacing.

16. The method of claim 8, wherein the plurality of seismic energy receiver stations and the plurality of receiver lines and plurality of seismic energy source stations and the plurality of source lines have different spacings.

\* \* \* \* \*